April 3, 1956     H. W. STRAAT     2,740,320
REFRACTOMETER
Filed Oct. 22, 1954     2 Sheets-Sheet 1
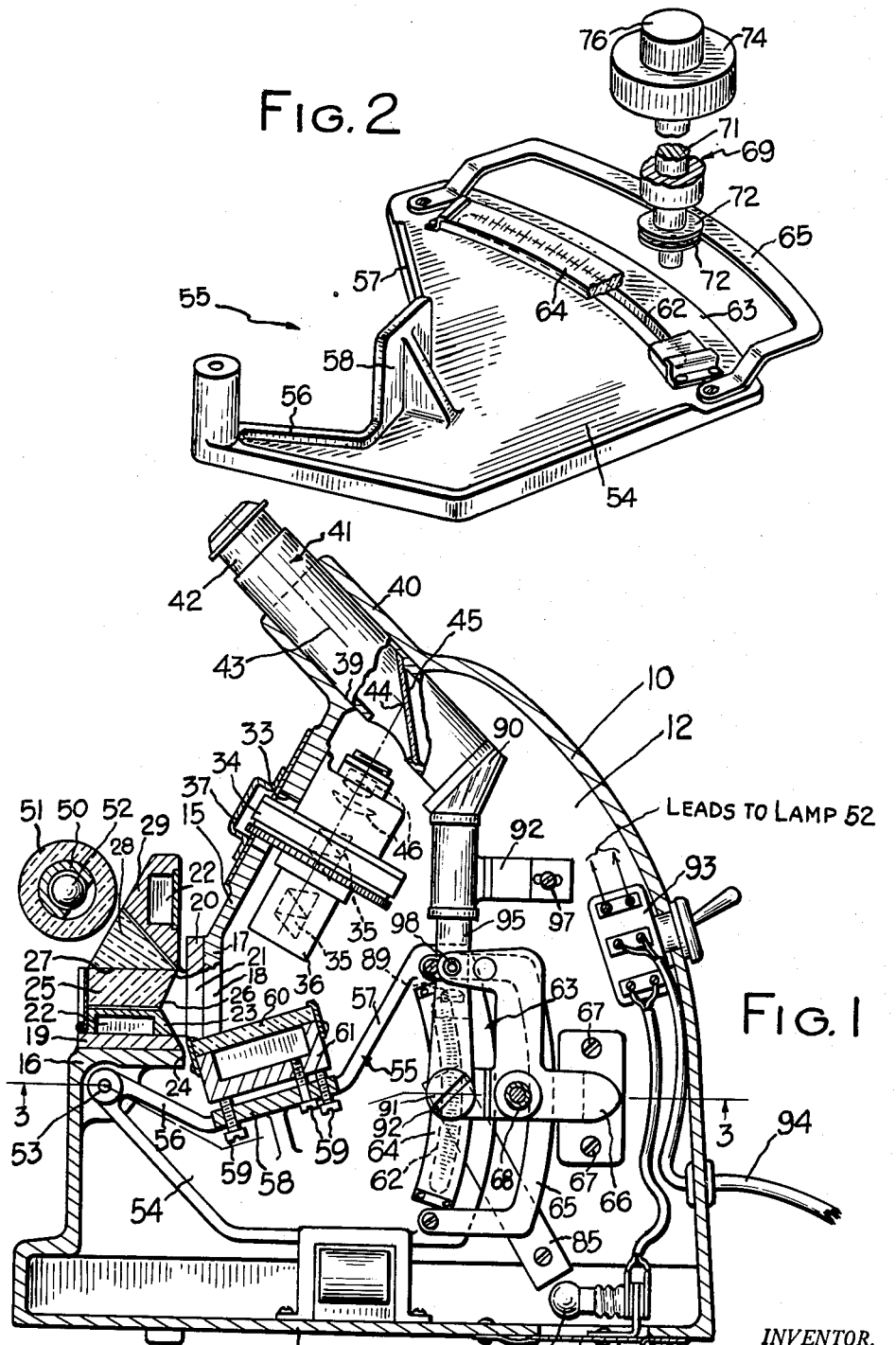
INVENTOR.
HAROLD W. STRAAT
BY
ATTORNEYS

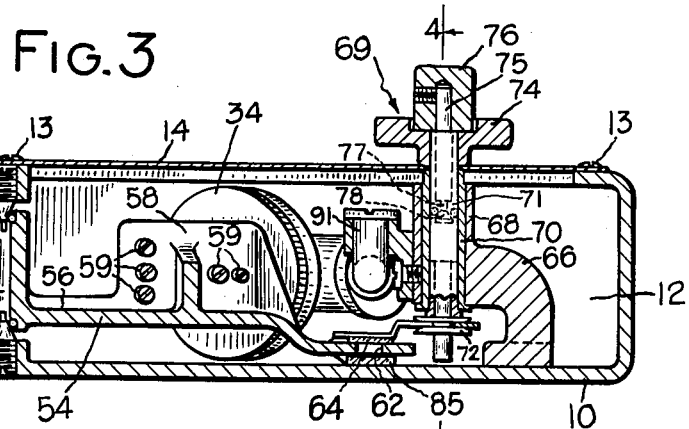
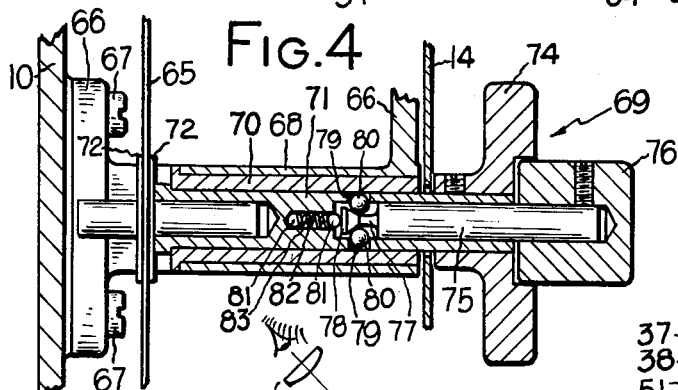
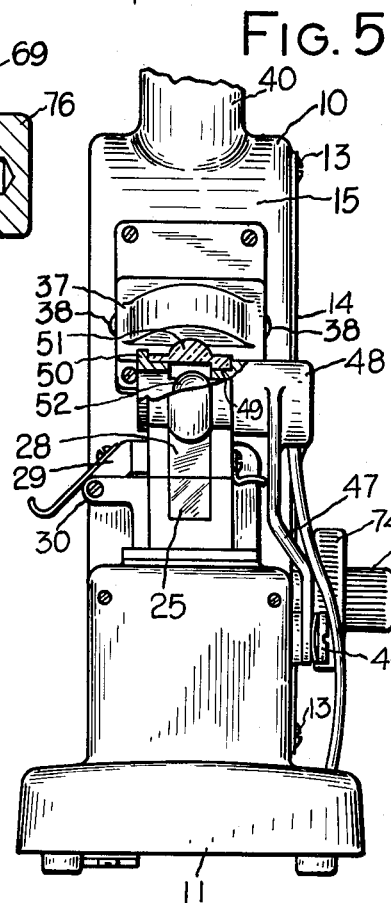
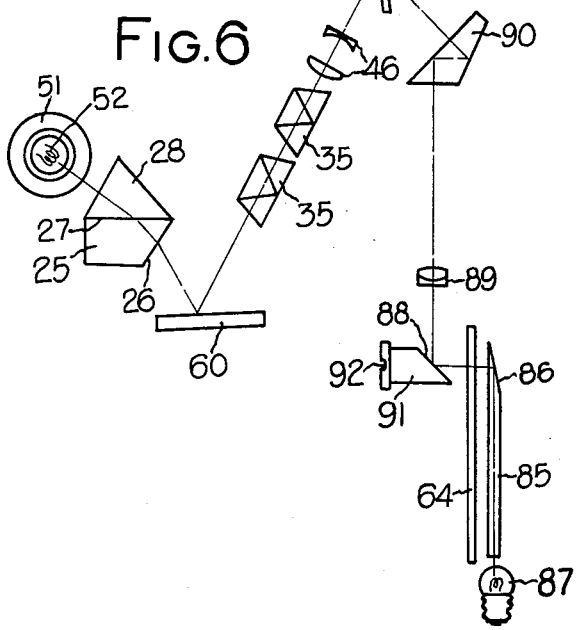

United States Patent Office 2,740,320
Patented Apr. 3, 1956

2,740,320

REFRACTOMETER

Harold W. Straat, Irondequoit, N. Y., assignor to Bausch & Lomb Optical Company, Rochester, N. Y., a corporation of New York Application October 22, 1954, Serial No. 464,044

9 Claims. (Cl. 88—14)

This invention relates to refractometers of the Abbe type and more particularly it relates to improvements in the operating mechanisms therefor.

Conventional refractometers of the Abbe type have been constructed with the refracting prism and telescope pivoted relatively to each other. In some current models of the Abbe refractometer, the refracting prism and telescope axis are fixed relative to each other on the housing and a mirror is moved along the optical path between the prism and telescope for making settings of the instrument. Such types, although obviously improving upon the prior refractometers, have some disadvantages. For instance, the mirror in one of such types of instruments is mounted on a member which moves on an arcuate track about a center of curvature which is imaginary. This method of mounting and supporting the arcuate track and mirror is complex, making the instrument expensive to build and maintain.

In another Abbe type refractometer having the prism and telescope axis fixed relative to each other, a mirror is pivotally mounted about a real center within the housing, but the drive means for the mirror mounting bracket is extremely costly and subject to inaccuracies.

It is, therefore, an object of this invention to overcome the above-noted disadvantages and to provide an improved refractometer of the type described having a fixed pivot center for the moving mirror.

Another object of this invention is to provide a refractometer which can be used for determining the refractive indices of materials throughout a relatively wide range of indices.

A further object of this invention is to provide a refractometer having an improved illumination system and optical system making it possible to view through the same eyepiece either the borderline of total reflection or the scale.

A still further object of this invention is to provide a refractometer that is efficient and accurate in operation yet is economical to build and maintain.

And a still further object of this invention is to provide a refractometer that has the telescope eyepiece and sample receiving surface of the prism facing the operator so as to facilitate loading the instrument.

These and other objects and advantages reside in certain novel features of construction, arrangement, and combination of parts as will hereinafter be more fully described and pointed out in the specification and appended claims.

Referring to the drawings:

Fig. 1 is a vertical sectional view, with parts in elevation, of a refractometer embodying the improvements of the present invention.

Fig. 2 is a perspective view of certain details of the invention.

Fig. 3 is a sectional view taken on the line 3—3 in Fig. 1.

Fig. 4 is a sectional view taken on the line 4—4 in Fig. 3.

Fig. 5 is a partial front elevational view with parts broken away and in section.

Fig. 6 is a schematic diagram of the optical system and illuminating system of the instrument.

In the preferred form of the invention, as shown in the drawings, the refractometer comprises a housing 10 integrally formed with a base 11 and having an interior chamber 12 into which access is gained by removing screws 13 from the cover plate 14 on one side of said housing 10.

A front wall 15 on the housing 10 has an offset portion comprising a horizontal support 16 and a vertical wall 17 having an opening 18 communicating with the chamber 12. Fitting into and attached to the offset portion is an insert member having a base 19 and an upstanding wall 20 which has an opening 21 in alignment with the opening 18 in the vertical wall 17. Mounted on the base 19 is a heat exchange unit 22 which has a rear face 23 sloping downwardly and rearwardly thereof toward the projection or rear portion 24 of the horizontal support 16 which extends slightly into the chamber 12. Mounted on said heat exchange unit 22 is a refracting prism 25 having a rear face 26 sloping downwardly and forwardly. The lower rear edge of the prism 25 and the upper rear edge of the heat exchange unit 22 meet substantially along a common line so that the combined area of the rear faces of the heat exchange unit and prism is substantially coextensive with the area of the opening 21.

The prism 25 has a horizontal top surface 27 for receiving samples under examination. A mating prism 28, carried by a frame 29, is mounted to pivot about a pin 30 on the housing 10 so that prism 28 may be swung out of contact with the surface 27 in order that a liquid sample to be tested may be placed between the prism 28 and the surface 27 for holding the sample in the manner well known in the art. A second heat exchange unit 22 is formed in the frame 29 whereby a fluid having a carefully controlled temperature may be passed through the two heat exchange units 22 for controlling the temperatures of the prisms and sample.

A second opening 33 in said front wall 15 has rotatably mounted therein a ring 34 marked with oppositely arranged twin compensator scales, which when read with respect to a reference point, indicate the angular position to the left or right of a pair of Amici prisms 35 mounted in the tube 36 attached to said ring 34 for achromatization of the line of total reflectance in the field of view of the instrument. A transparent plastic cover plate 37 is snapped onto the housing 10 by means of clips 38 for covering the ring 34 to protect against accidental turning of said ring and to form a dust seal for the chamber 12.

Projecting upwardly and forwardly from the lip of opening 39 in the forward wall 15 is a sleeve 40 in which is mounted an optical system including a telescope 41 having an eyepiece 42 aligned along an optical axis 43 bent at 44 by a partially reflecting, partially transmitting beam-splitter type mirror 45. The beam splitter 45 bends the optical axis of the telescope so that a pair of conventional lens elements 46, mounted in tube 36, together with the Amici prisms 35 complete the telescope system which will lie along an axis inclined at an angle with respect to the plane of the sample surface of the prism. The telescope eyepiece 42 is mounted on the same side of the instrument as the horizontal surface 27 of the prism 25 so that an operator of the instrument may load the sample onto the prism 25 without reaching around the instrument. This is a distinct advantage over prior art instruments in which the prism is located on the side opposite the operator, necessitating awkward reaching around the instrument for loading.

Pivoted about a pin 46 on housing 10 is an arm 47 which supports a hub 48 having an offset lip 49 for receiving both the rotatable split ring 50 and the concentrically positioned clear plastic toric lens 51, both last-named elements enclosing a light source 52. Rotation of the split ring 50 and toric lens 51 about their horizontal axis, as well as pivoting the hub 48 about pin 46, will permit the adjustment of the light source 52 in proper relationship with respect to the prism 25 for illuminating a sample under examination.

Mounted within the chamber 12 in the housing 10 below and forwardly of the rear face portion 26 of the prism 25 on a pivot pin 53 is a bracket 54 having in its upper edge a reentrant portion 55 which has spaced diverging walls 56, 57 upwardly extending from a flattened web 58. Adjustably fastened by screws 59 in the reentrant portion 55 on the flattened web 58 is a mirror 60 which is mounted on a cup-shaped element 61 in spaced relation to the diverging wall 56 and the pivot pin 53. Lying in substantially the same plane with said pivot pin 53 is the mirror 60 which is mounted in position to receive light rays from the prism 25 and direct them into the optical system so that all refracted rays from the prism will be directed along the optical axis of the telescope. The spacing between the mirror 60 and the diverging wall 56 of the bracket 54 is such as to accommodate the rear portion 24 of the horizontal support 16 and the rear face 23 of heat exchange unit 22 throughout a substantial portion of the arc of movement of the bracket 54 and thereby permit a large arc of movement for the mirror 60 relative to the prism 25. The pivot pin 53 is placed as far forward of the rear face 26 of the prism 25 as is mechanically possible to provide the maximum range of travel for the bracket 54 from one extreme position of the mirror to the other. With the plane of the mirror lying in substantially the same plane as the pivot pin, any movement of the mirror about the pivot pin will be a true rotational movement and will not have translational or sliding motion. With this motion of the mirror all rays, including extreme rays, will be directed in the direction of the telescope and along the optical axis of the telescope.

The bracket 54, having an arcuate slot 62 through a portion 63 which is spaced from the pivot pin 53, has fastened over said arcuate slot 63 a translucent scale 64 which is calibrated in appropriate units. Fastened to and, in part, spaced from said portion 63 of the bracket 54 is an arcuately shaped track 65 lying substantially parallel to the arcuate slot 62 and having its center of curvature on the axis of the pin 53. A frame 66, attached to the housing 10 by screws 67, has integrally formed therewith a sleeve 68 which supports an actuating device 69 in position with respect to the track 65 so that turning said actuating device 69 will move the bracket 54 about the pin 53 and will sweep the mirror 60 through the rays refracted from the prism 25.

Said actuating device 69, best shown in Figs. 2 and 4, comprises a cylindrical bearing 70 concentrically mounted between the sleeve 68 and a rotatable shaft 71. Said shaft 71 extends into the space between the track 65 and bracket 54 and has a pair of friction discs 72 mounted on one end thereof for frictionally engaging one edge of the arcuately shaped track 65. Fastened on the other end of shaft 71 is a knob 74 which, when turned, is adapted to move the bracket 54 about the pivot pin 53. The knob end of shaft 71 is internally bored for rotatably receiving a rod 75 having a second knob 76 fastened thereon for interfitting into a recessed portion of the knob 74. Said rod 75 has a narrow neck portion 77 which tapers outwardly into an enlarged shoulder 78. The bored portion of the shaft 71 has formed in a wall portion thereof a plurality of holes 79 in which are seated a plurality of balls 80 which are spaced around the neck portion 77 of the rod 75. A pair of balls 81, separated by a spring 82, are nested in a blind hole 83 in the shaft 71 with one of said balls 81 bearing against the end of said rod 75 for frictionally engaging the balls 80 both with shoulder 78, and with the inner surface of bearing 70. Rotation of the knob 74 will rotate the shaft 71 and friction discs 72 to move the bracket 54 about pin 53 with a speed ratio of one to one. However, rotation of the knob 76 will rotate the balls 80 which will in turn rotate the shaft 71 and discs 72 for moving the bracket 54 about pin 53 with a substantially reduced ratio depending on the diameter of the balls 80, the diameter of the contacted portion of the enlarged shoulder 78 and the inside diameter of the bearing 70. The preferred speed reduction ratio is five to one for producing a reasonably fine adjustment for the instrument. The friction drive arrangement for the new refractometer is a positive driving arrangement for moving the bracket and the mirror. It is efficient in operation and cheap to build and maintain since it requires no costly machining or gear cutting operations.

The preferred form of a scale viewing optical system, best shown in Figs. 1 and 6, comprises a strip of clear plastic 85, made of Lucite, for example, having a light reflecting surface 86 so positioned in the housing that illumination from the light source 87 will be directed upon the scale 64. An image of the illuminated scale is reflected by mirror 88 to condenser lens 89 and prism 90 where it is transmitted through the beam splitter 45 to the eyepiece 42 of the telescope 41. Angularly formed on one end of a plug 91 is the mirror 88 which is maintained at an angle of approximately 45° to the horizontal. The other end of the plug 91 has a slotted head 92 which is used to rotate said plug 91 and mirror 88 for adjusting the angle of the mirror 88 relative to the optical axis of the beam of light from source 87 to the eyepiece 42. It is desirable that the longitudinal axis of the plug 91 lie in the plane of and parallel to the longitudinal axis of the pivot pin 53 of the bracket 54. Wherefore, when the plane of the mirror 88 and the plane of the optical axis of the source 87, strip 85 and lens 89 lie perpendicular to each other, the largest viewing aperture of the scale 64 will be presented to the telescope system. Slight deviation from the just-described condition will change the shape of the aperture from round to oblong thus cutting down the size of field viewed.

The light sources 52 and 87 are connected to opposite sides of a switch 93 in such a way that either one or the other source may be energized at one time. The lead 94 is connected to the switch 93 and to an appropriate source of electricity.

The lens 89 and prism 90 are mounted in a tube 95 which is adjustably fastened to the housing 10 by means of a bracket 96 and screw 97 as well as by means of adjusting screw 98 on the arm of the frame 66. A combination of adjustments of screws 97, 98 will accurately adjust the scale viewing portion of the second optical system.

The beam splitter 45 is composed of a glass plate that has a coating thereon which partially transmits and partially reflects light rays so that when light source 52 is energized, an observer looking into eyepiece 42 may, after adjustment of the bracket 54 and mirror 60, view the borderline of total reflection of the sample being examined since the beam splitter 45 will reflect to the eyepiece 42 a substantial portion of the rays striking it from the mirror 60. However, when light source 87 is energized, the light rays from the aligned portion of scale 64 will be transmitted through the beam splitter 45 for viewing in the eyepiece 42.

In operation, a drop of a sample to be tested is placed on the surface 27 of the prism 25 and the mating prism 28 is closed on top thereof. The light source 52 is energized and adjustably positioned relative to the prisms 25, 28 to provide the best illumination for the sample. By turning knob 74 the bracket 54 and mirror 60 will be pivoted about the pin 53 until a borderline of total reflection is viewed in eyepiece 42. The fine adjustment knob 76 is then turned to set the borderline of total reflection in the correct position. The Amici prisms are adjusted, either before or after fine adjustment, for achromatization of the line of total reflection. Once the borderline has been correctly positioned, the light switch 93 is flipped to deenergize source 52 and to energize source 87. In this way the borderline scale reading 64 may be viewed in the eyepiece to give the refractive index of the sample. If desired, the scale may be calibrated to give readings in terms of Percentage of Solids, Butyro numbers or any other units which are a function of refractive index.

From the foregoing, it will be obvious that there is here provided a rugged, precision refractometer having a wide and complete range of refractive index readings. Effective means are provided for improving the illumination and optical systems making it possible to view both the borderline of total reflection and the scale reading in the same eyepiece. An instrument is provided that is efficient and accurate in operation yet is economical to build and maintain. Although but one form of this refractometer has been shown and described in detail, it will be understood that other forms are possible and changes may be made in the arrangement and detailed structure of the parts and substitutions may be made without departing from the spirit of the invention as defined in the claims here appended.

I claim:

1. In a refractometer the combination of a housing having a front wall provided with an opening, a horizontal support carried by the front wall and having a projection extending into the housing adjacent the opening, a refracting prism carried by the support, an optical system including a telescope carried by the housing above the plane of the prism, a bracket mounted to turn about a pivot pin which is carried by the housing below and forwardly of said projection on said support, means for moving said bracket, a mirror carried by the bracket in position to receive light rays from the prism and direct them into the optical system, said mirror and pivot pin lying in substantially the same plane, the portion of the bracket lying between the pivot pin and the mirror being formed to provide a space into which the projection is received when the bracket is moved upwardly whereby the operating range of the instrument is increased.

2. A refractometer comprising a housing having a front wall with an opening therethrough, a horizontal support carried by said front wall below said opening and having a projection extending into the housing, a refracting prism carried by said support, a light source movably mounted on the front wall of the housing in spaced relation to a sample receiving surface of the prism, a bracket mounted to turn in the housing about a pivot pin carried by the housing below and forwardly of the projection on the support, a mirror carried by said bracket and lying substantially in a plane containing the axis of the pivot pin, the portion of the bracket between the mirror and pivot pin being formed to provide a space into which the projection of the support is received when the bracket is moved upwardly, means for turning the bracket about the pivot pin, an optical system including a telescope having an eyepiece carried by the upper portion of the front wall of the housing and spaced above the prism and means carried by the housing in the optical path of the optical system for reflecting the refracted rays from the prism and mirror to the eyepiece of the telescope whereby the borderline of total reflection may be viewed in the eyepiece of the telescope.

3. In a refractometer the combination of a housing, a horizontal support carried by the front wall of the housing and having a projection extending into an opening in the housing, a refracting prism carried by said support and having a rear portion facing said opening in the housing, an optical system including a telescope carried by said housing and extending upwardly at an angle with respect to a horizontal surface of the prism, a bracket mounted to turn about a pivot pin carried by the housing below and forwardly of the projection of the support, said bracket having in its upper edge a reentrant portion formed with spaced diverging walls, a mirror carried by said bracket in said reentrant portion in spaced relation with said walls to provide an open space in the bracket between said mirror and said pivot pin, said open space being formed to receive the rear portion of the support when the bracket is moved upwardly, said mirror and pivot pin lying in substantially the same plane for positioning the mirror to receive light rays from the prism and direct them into the optical system, and means for moving said bracket about said pivot pin whereby the mirror passes through a wide range of refracted rays from the prism.

4. In a refractometer the combination of a housing having a front wall provided with an opening therein, a horizontal support on the housing having a projection extending into said opening, a refracting prism carried by said support and having a rear portion facing said opening, an optical system including a telescope fixed on said housing, a light source carried by the housing in alignment with the prism for illuminating a sample on said prism, a bracket having one end portion pivotally mounted within the housing below and forwardly of the rear portion of the prism, said bracket having in its upper edge a reentrant portion formed with spaced diverging walls, a mirror carried by said reentrant portion of the bracket in spaced relation with the walls of said reentrant portion, the projection of the support being received in the space between the forward wall of the reentrant portion of the bracket and the mirror throughout a substantial portion of the arc of movement of the bracket, said mirror being positioned to receive light rays from the light source and prism and direct them into the optical system throughout the full range of movement of the bracket, scale means on the opposite end portion of said bracket, a second light source in the housing for illuminating said scale means, optical means for transmitting the scale reading to the telescope, switch means for alternatively energizing the light sources, and drive means engaging with the bracket for moving said bracket and mirror whereby the borderline of total reflection and its concomitant scale reading may be viewed in the telescope by alternatively energizing the respective light sources.

5. In a refractometer having a housing with a front wall, an offset portion in said front wall comprising a vertical wall having an opening therein and a horizontal support extending into said opening, a refracting prism carried by said support, and an optical system including a telescope carried by said housing and having its optical axis fixed relative to said prism, the combination of a movable mirror mounted adjacent the rear portion of said prism and the optical axis of said telescope for reflecting light rays from the prism along the optical axis of the telescope, means for pivotally mounting said mirror on said housing comprising a bracket having a reentrant portion in the upper side, a pivot pin passing through one end of said bracket for pivotally mounting said bracket to said housing below and forwardly of the rear portion of said support, said mirror being mounted in and to one side of said reentrant portion in said bracket for providing an opening between the mirror and the pivoted end of the bracket, the horizontal support for the prism fitting into said opening between the mirror and bracket throughout a substantial portion of the arc of travel of said bracket about the pivot pin, scale means on the bracket spaced from the pivot pin, optical means for forming an image of the scale in the telescope, and drive means for moving said bracket about said pivot pin for sweeping the mirror and scale through the range of refracted rays of the prism.

6. A refractometer comprising a housing having a front wall with an opening therethrough, a horizontal support carried by said front wall and having a projection extending into the housing adjacent the opening, a refracting prism carried by said support and having a rear portion facing said opening in the housing, an optical system including a telescope having an eyepiece carried by the housing above the plane of the prism, a light source carried by the housing for illuminating a sample receiving surface of the prism, a bracket mounted to turn about a pivot pin which is carried by the housing below and forwardly of the projection on the support, a mirror carried by said bracket and lying substantially in a plane of the pivot pin, said mirror being positioned to receive light rays from the prism and direct them into said optical system, said bracket having a portion lying between the pivot pin and mirror formed to provide a space into which the projection of the support is received when the bracket is moved upwardly, means for moving said bracket about said pivot pin, a scale carried by a portion of the bracket spaced from the pivot pin, a light reflecting and light transmitting beam splitting mirror carried by the housing along the axis of the optical system for reflecting the light rays from the prism to the eyepiece, a second optical system in optical alignment with the beam splitting mirror for transmitting light rays from the scale to the above-named eyepiece, a second light source carried by the housing for illuminating the scale for the second optical system, switch means for selectively energizing the first and second light sources whereby light rays from the prism and their concomitant scale reading may be selectively viewed in the eyepiece.

7. In a refractometer the combination of a housing having a front wall with an opening therein, a horizontal support carried by said front wall and having a projection extending into said opening, a heat exchange unit mounted on said support, a refracting prism mounted on said heat exchange unit and having a rear portion facing said opening, said heat exchange unit controlling the temperature of the prism, an optical system carried by the housing and having a telescope carried by the front wall in a plane above the plane of the prism, a bracket mounted to turn about a pivot pin which is carried by the housing below and forwardly of the projection on the support, a mirror carried by the bracket and lying in substantially the same plane as the pivot pin, said mirror being positioned on the bracket to receive light rays from the prism and direct them into the optical system, said bracket having a portion lying between the mirror and pivot pin formed to provide a space into which the projection of the support is received when the bracket is moved upwardly, means for turning the bracket about the pivot pin, and scale means carried by the bracket and coordinated with the position of the mirror in the path of light rays whereby for each setting of the mirror there is a corresponding scale reading.

8. In a refractometer having a housing, a refracting prism and an optical system carried by the housing at an angle relative to each other, and a mirror movably mounted in the housing for reflecting light rays from the prism into the optical system, the combination of means for movably mounting said mirror in said housing comprising a bracket, a pivot pin carried by the housing and passing through one end portion of the bracket for pivotally mounting the bracket in the housing, a scale carried by the bracket, means cooperating with the scale for indicating the movement of the mirror in terms of refractive index, an arcuately shaped track carried by and spaced from the bracket, the arcuate portion of the track having its center of curvature substantially at said pivot pin, a rotatable shaft carried by the housing and extending into the space between the bracket and the track, a pair of friction discs fastened to said shaft and engaging with said track, and means carried by the shaft and housing for providing coarse and fine adjustments for said shaft whereby turning the shaft will move the mirror through the path of light rays.

9. A refractometer comprising a housing having a front wall, a refracting prism carried by said front wall, an optical system including a telescope carried by the housing above the plane of the prism, a bracket in the housing mounted to turn about a pivot pin, a mirror carried by the bracket and positioned to receive light rays from the prism and direct them into said optical system, said bracket having an arcuate slot therethrough which is spaced from the pivot pin, a translucent scale mounted over said slot in alignment with a light source for illuminating said scale, an optical system aligned with said light source and scale for forming an image of the scale in the telescope, an arcuately shaped track carried by and spaced from the portion of the bracket carrying the scale, the arcuate portion of the track lying substantially parallel to the arcuate slot in the bracket, means for turning said bracket about said pivot pin comprising a rotatable shaft carried by the housing and extending into the space between the bracket and the track, a pair of friction discs fastened to said shaft and engaging with said track, and means carried by the shaft for providing coarse and fine adjustments to said shaft.

References Cited in the file of this patent

FOREIGN PATENTS

| | | |
|---|---|---|
| 257,127 | Great Britain | Aug. 26, 1926 |
| 462,332 | Great Britain | Mar. 8, 1937 |
| 690,268 | Great Britain | Apr. 15, 1953 |